(12) United States Patent
Dietsch et al.

(10) Patent No.: US 6,709,530 B1
(45) Date of Patent: Mar. 23, 2004

(54) VEHICLE TREATMENT SYSTEM AND OPERATING METHOD

(75) Inventors: Wolfgang Dietsch, Frankfurt (DE); Walter Klos, Luedenscheid (DE)

(73) Assignee: Washtec Holding GmbH, Augsburg (DE)

( * ) Notice: Subject to any disclaimer, the term of this patent is extended or adjusted under 35 U.S.C. 154(b) by 0 days.

(21) Appl. No.: 09/914,365

(22) PCT Filed: Feb. 23, 2000

(86) PCT No.: PCT/EP00/01459
§ 371 (c)(1),
(2), (4) Date: Aug. 24, 2001

(87) PCT Pub. No.: WO00/50278
PCT Pub. Date: Aug. 31, 2000

(30) Foreign Application Priority Data

Feb. 24, 1999 (DE) ..................................... 299 03 300 U
May 21, 1999 (DE) ..................................... 299 08 866 U

(51) Int. Cl.⁷ ............................................... B08B 7/04
(52) U.S. Cl. ........................... 134/18; 134/34; 134/45; 134/172; 15/DIG. 2
(58) Field of Search ............................... 134/18, 42, 35, 134/36, 45, 172, 181, 197, 34; 15/DIG. 2

(56) References Cited

U.S. PATENT DOCUMENTS

| | | | |
|---|---|---|---|
| 3,596,241 A | | 7/1971 | Migneault |
| 4,981,523 A | * | 1/1991 | Larson et al. ................. 134/18 |

FOREIGN PATENT DOCUMENTS

| | | | | |
|---|---|---|---|---|
| DE | 32 08 527 | | 11/1982 | |
| DE | 40 02 480 | | 8/1991 | |
| DE | G 92 15 013.6 | | 2/1993 | |
| DE | 44 17 864 A1 | | 11/1995 | |
| DE | 196 39 054 A1 | | 3/1998 | |
| DE | 297 23 828 U1 | | 5/1999 | |
| EP | 0 283 446 | | 9/1988 | |
| EP | 507 757 | | 10/1992 | |
| JP | 60 128047 | | 7/1985 | |
| JP | 01 297344 | | 11/1989 | |
| JP | 06 321067 | | 11/1994 | |
| JP | 08 119071 | | 5/1996 | |
| JP | 08 207713 | | 8/1996 | |
| JP | 10 001032 A | | 1/1998 | |
| JP | 10001032 A | * | 1/1998 | ............. B60S/3/06 |
| JP | 10230821 A | * | 9/1998 | ............. B60S/3/04 |

OTHER PUBLICATIONS

U.S. patent application Ser. No. 09/701 129, filed Jan. 26, 2001; Inventors: Wolfgang Dietsch et al.

* cited by examiner

*Primary Examiner*—Alexander Markoff
(74) *Attorney, Agent, or Firm*—Flynn, Thiel, Boutell & Tanis, P.C.

(57) ABSTRACT

The invention relates to an operating method and a vehicle cleaning system comprising at least one treatment device, a control unit and a device for the optical detection of a vehicle. According to said method a vehicle entering or situated in the system is optically detected by a camera system inside the vehicle cleaning system. The data are entered into the control unit so as to control or regulate one or more system functions. Said data can be used in particular to control a drive-in aid or the treatment device which comprises washing brushes, high-pressure nozzles, dryer nozzles, etc.

22 Claims, 4 Drawing Sheets

VEHICLE TREATMENT SYSTEM AND OPERATING METHOD

FIELD OF THE INVENTION

The invention relates to a vehicle treatment system and a method for the operation of a vehicle treatment system with the characteristics in the preamble of the method and apparatus main claim.

BACKGROUND OF THE INVENTION

It is known from the EP-A-0 507 757 to scan and record within the vehicle treatment system the height contour of the positioned and standing vehicle using a movable light barrier, which is fastened on the roof nozzle of the drying device, and is moved with the same over the vehicle. The lateral distance of the vehicle from the portal is measured through ultrasound sensors.

The DE-A-32 08 527 shows a modification of this method with a more complex light-barrier arrangement which is arranged stationarily in front of a car-washing path and which scans the height contour of the passing vehicle.

The known optical scanning devices offer limited information and are also not without problems in their operation and in the evaluation of the signals. For a more complex scanning of the vehicle several different scanning devices are needed.

SUMMARY OF THE INVENTION

The purpose of the present invention is to provide an improved vehicle treatment system and method for the operation of a vehicle treatment system.

The invention attains this purpose with the characteristics in the method and apparatus main claim. The camera systems of the invention or the so called vision systems have the advantage that they can be utilized for different purposes. With the camera systems, it is possible to take individual images or continuous pictures of the entire visible shape of the approaching or standing vehicle, and, if necessary, also of the surrounding periphery in the vehicle treatment system, and to utilize these for the control or regulation of one or several system functions.

The pictures can thereby be evaluated in connection with a suitable image-evaluating device and controlled according to varying criteria. The camera system can hereby be designed as a measuring device, which carries out, for example, a measurement of the position and alignment of the vehicle during driving in and/or in the final position, and can forward the data to the control unit of the vehicle treatment system. As an alternative it is possible to detect the contour and/or size of the vehicle and to forward this information to the control unit of the vehicle treatment system.

On the one hand it is possible to utilize the camera system for a drive-in aid. However, it can also be used to control the vehicle treatment system itself. In particular, it can be used in connection with a contour detector for the control and/or regulation of the treatment process. The camera system furthermore enables a light-controlled remote control of the vehicle treatment system. In addition the camera system can be used for monitoring the entire system, whereby, for example, a monitoring for possible collisions, incorrect positions of the washing brushes, spraying and drying nozzles, system breakdowns from outside, quality of the treatment results, etc. is carried out (takes place).

The drive-in aid makes it possible to safely and reliably guide the vehicle operator. He thereby receives steering instructions through the signaling device, with which instructions he can correct incorrect positions during the positioning and alignment of the vehicle. In particular he can thus correct skewed positions or a lateral shift, which is too great, relative to the drive-in track. Mechanical guide rails or similar guiding devices engaging the vehicle itself are not needed. By deleting such guide rails the safety from accident, and also the comfort in the vehicle treatment system can be improved.

The vehicle treatment system can be started and, if necessary, stopped by the vehicle operator himself by means of a remote control. A start signal can, for example, be given by blinking a light signal, and a stop signal can be given by a second blinking signal, if necessary, with a different rhythm. The stop signal can also, in cases of emergency, trigger an alarm for the operator of the system. The vehicle operator no longer needs to leave his vehicle during the vehicle washing in a portal washing system. He can remain seated in the vehicle, protected against wetness, coldness and other undesired outside influences. Furthermore the danger of accidents is minimized by eliminating the need for getting out of and into the vehicle. The mentioned advantages also apply to possible other guests in the vehicle.

Camera systems are particularly inexpensive and reliable in operation. They operate reliably and precisely even under the surrounding conditions existing in a vehicle treatment system. In particular the expense of installation, set up, service and operation is low. If only one drive-in aid is required, inexpensive low resolution camera systems with small demands on the calculating capacity, which camera systems are aimed at the switched-on headlights of the vehicle, are sufficient. Better, high resolution, camera systems permit the aforementioned contour detection with the control and monitoring functions.

Further advantageous developments of the invention are disclosed in the subclaims.

BRIEF DESCRIPTION OF THE DRAWINGS

The invention is exemplarily and schematically illustrated in the drawings, in which.

DETAILED DESCRIPTION

FIGS. 1 to 4 schematically illustrate a vehicle treatment system (1). The system is designed as a vehicle cleaning system in the illustrated embodiment. Alternatively the system may also be a vehicle polishing system or any other desired type of a vehicle treatment system.

Figure 4:
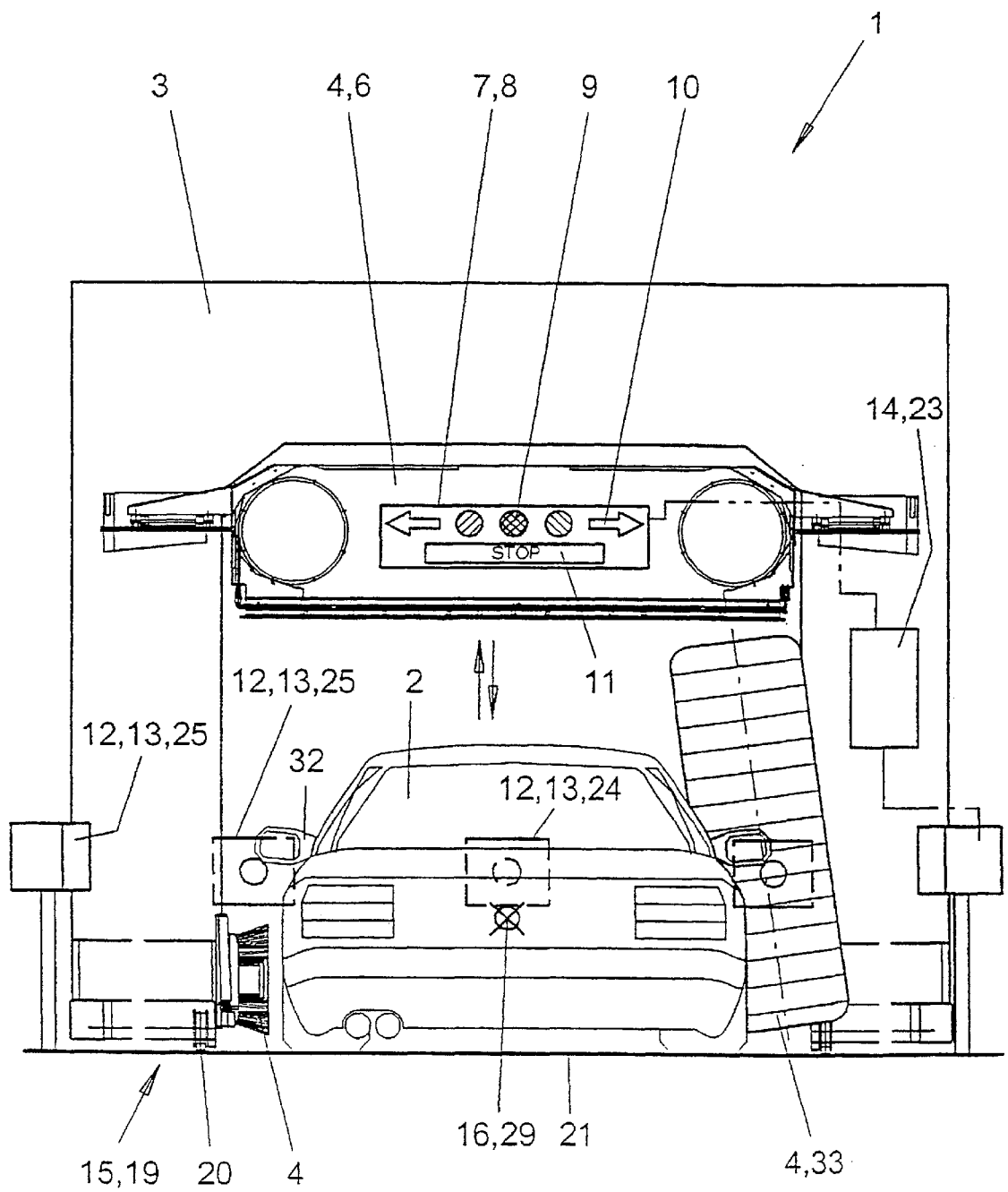
FIG. 4 is a front view of the vehicle treatment system of FIG. 3.

The vehicle cleaning system (1) consists of one or several portals (3) or other guideways, on which are housed among other devices a cleaning device (4) with an operating-medium supply, a drying device and a control unit (14). The cleaning device (4) may be designed as desired and may have high-pressure nozzles, roof and side brushes (33) or other similar aggregates. FIG. 4 illustrates, for the purpose of clarity, one wheel-washing brush and one side brush (33).

The drying device houses at least one liftable and lowerable roof-drying nozzle (6). In addition one or several movable or stationary side nozzles can be provided. The roof-drying nozzle (6) can alternatively also be stationary. In the preferred embodiment, the nozzle has a vertical guideway in the gantry (3) and a lifting drive.

In the illustrated embodiment, the vehicle cleaning system (1) is designed as a portal cleaning system with an entry (17) and, if desired, an exit (18). The portal (3) is equipped with all necessary aggregates and moves hereby relative to the stationary vehicle (2). The vehicle (2) is driven by the vehicle operator on a drive-in track (21) from the drive-in direction (16) to the front of or under the standing portal (3). After the cleaning, the vehicle (2) can, depending on the design of the system, leave the system (1) forwardly through the exit (18) or backwards through the inlet (17).

The vehicle cleaning system (1) can alternatively be designed as a tandem or cycle installation. In the case of the tandem installation, two portals are provided which are erected one behind the other and are equipped with different aggregates. The portals can move separately from one another or together. In the case of a cycle installation two or more portals are arranged one behind the other and are separated into different treatment areas by a movable intermediate wall. The vehicle operator drives the vehicle under the next portal after the first treatment operation has been concluded. The vehicle can also be moved by a tugging device. Combinations of these types of systems are also possible. The vehicle cleaning system (1) can basically also be designed as a washing path or in any other desired manner.

At least one optical detection device is arranged within the vehicle cleaning system (1), which detection device scans the vehicle without contacting the same and is designed as a camera system (12) or a so called vision system. The camera system (12) consists of one or several cameras (24, 25) which, according to FIGS. 1 to 3, can be arranged and designed differently. Several cameras (24, 25) can hereby cooperate for a three-dimensional detection.

The cameras (24, 25) have a large information density and can preferably receive a complete image of the vehicle (2) driving in or standing in their field of vision. The images can be one or several essentially standing individual images or instead continuous images. The cameras (24, 25) are designed as analogous, preferably digital cameras, which receive a flat or, if necessary, a three-dimensional image in screen form with a plurality of exactly defined and individually controllable image spots by means of a CCD-chip, CMOS-chip or the like, which image can be measured or can be evaluated in another manner. The image detection and image evaluation can be carried out with a preferably high cycle frequency of, for example, 25 images/sec. or more.

The cameras (24, 25) are positioned at a known place and with a known viewing direction (31). They look preferably directly onto the vehicle (2) and/or parallel to the vehicle (2) or along the vehicle (2).

The cameras (24, 25) are connected to at least one image-evaluating device (23) and a control unit (22). Each camera (24, 25) can thereby have its own, preferably integrated, image-evaluating device. As an alternative it is also possible to provide a common image-evaluating device (23) for several cameras (24, 25). The image data of the individual cameras (24, 25) can be compared with one another and can be evaluated together through the control unit (22) of the camera system (12). Possible movements of the cameras (24, 25) can also be controlled through the control unit (22).

The illustrated exemplary embodiment provides a common control unit (22) for the entire camera system (12). As an alternative it is also possible to provide several individual control units. The control units (22) and the image-evaluating device(s) (23) can be combined with one another. They are connected to the control unit (14) of the vehicle treatment system (1). This can be accomplished by an individual connection of the devices. As an alternative it is also possible to integrate the devices (22, 23) into the control unit (14). The control units (14, 22) are designed preferably as computer-supported, freely programmable control units equipped with suitable program and data stores.

Figure 1:
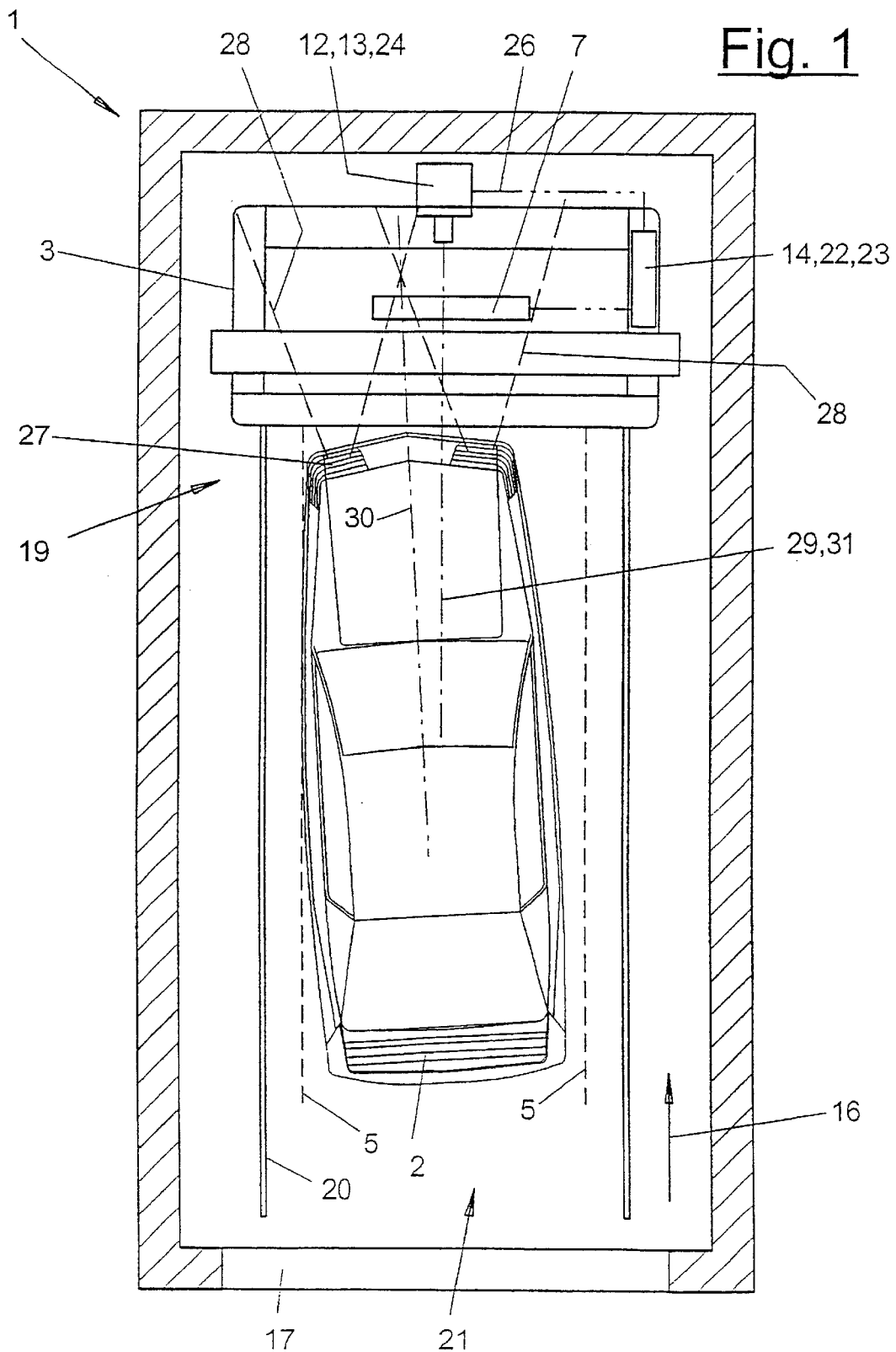
FIG. 1 is a top view of a vehicle treatment system with a drive-in aid utilizing a camera system.

In the exemplary embodiment of FIG. 1, the individual camera (24) is connected through a suitable line, preferably a videobus (26), to the control units or devices (14, 22, 23). In the exemplary embodiment of FIGS. 2 and 3 all five cameras (24, 25) are connected through such a videobus (26) to the devices (14, 22, 23). Preferably one single videobus (26) is provided hereby, which videobus connects also the individual cameras (24, 25) to one another.

Figure 2:
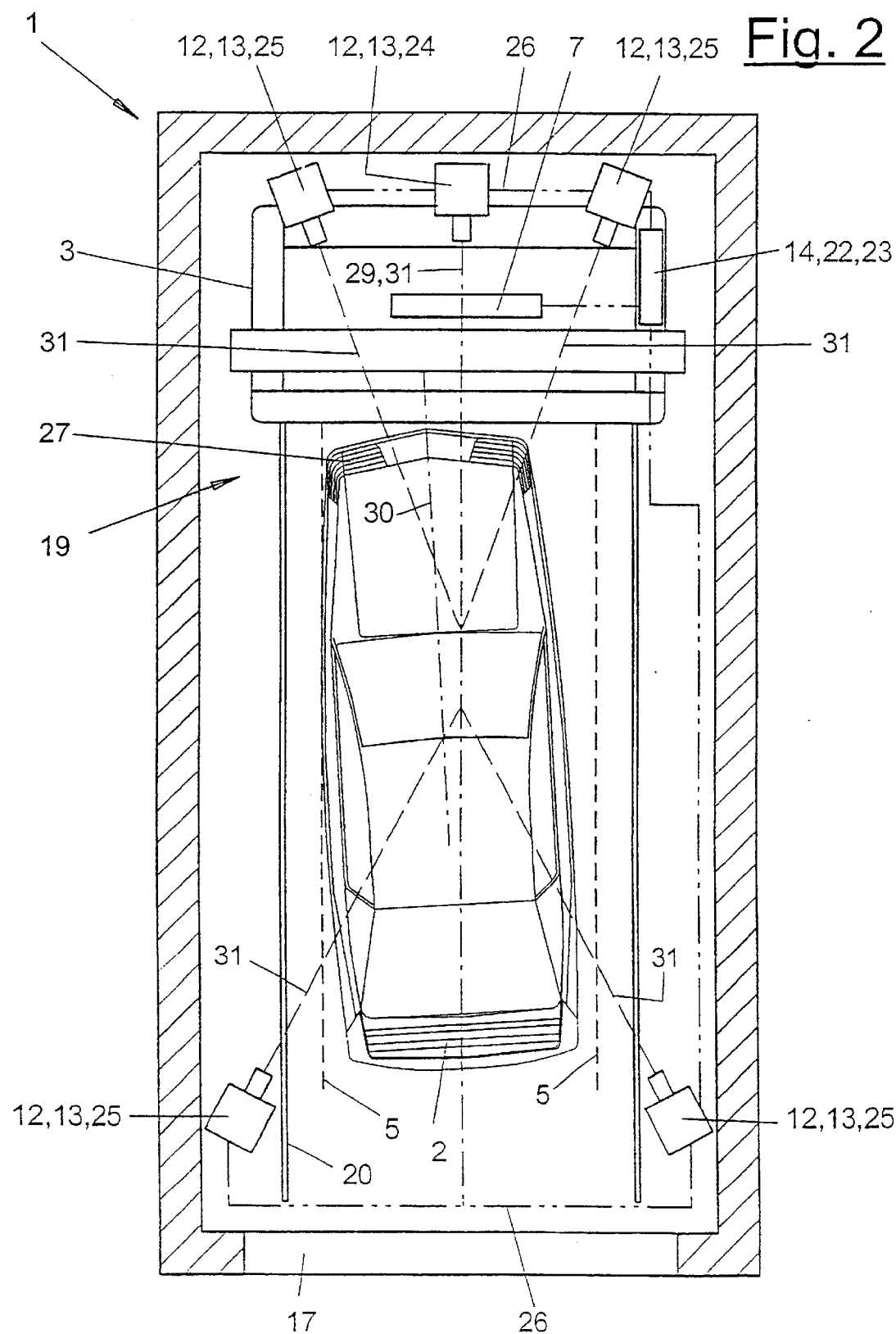
FIG. 2 illustrates a modification of FIG. 1 with several cameras.

The image evaluation of the camera images can be done in varying ways. The camera system (12) is preferably designed as a measuring device (13). The received images of the vehicle (2) are hereby measured. Several cameras (24, 25) with different viewing directions (31) can cooperate hereby, and can enable a three-dimensional measurement through their distribution. The measurement can be done thereby in different ways. On the one hand it can be determined using the known positions of the cameras (24, 25), when the vehicle (2) is within the vehicle treatment system (1). In particular it can thus be determined whether the vehicle is positioned off-center relative to the ideal drive-in line (29), and is laterally offset or possibly in an inclined positioned, as illustrated in FIGS. 1 and 2. The camera system (12) can also determine where the vehicle position is in the axial direction or the drive-in direction (16), through the cameras (24, 25), which are arranged in a suitable number and position. Moreover, it is also possible to determine the size and the contour of the vehicle (2) on all sides. Through this it can, for example, be determined where the wheels and the other relevant vehicle parts, like the hood of the engine, the front and rear windshield, the trunk lid, etc. The type of vehicle can also be identified using the contour data. The received contour and size data of the vehicle (2) can be recalculated into position data of the vehicle parts through the known position of the cameras (24, 25). With this, the control unit (14) of the vehicle treatment system (1) then knows where the vehicle (2) is positioned, which vehicle alignment (30) it has, and where the treatment-relevant vehicle parts, for example the wheels, the vehicle mirrors (32), etc. are provided. Using this vehicle data it is then possible to control the vehicle treatment system (1).

The cameras (24, 25) can receive and possibly measure the surrounding periphery aside from the vehicle (2). Thus it can be determined whether the path of travel of the gantry (3) is free or whether any kind of collision has resulted. Furthermore the position of the aggregates of the treatment device (4), for example of the washing brushes (33), can be received and can be checked. In addition the cameras (24, 25) can differentiate between light and dark. They can thus be used as a receiver for light signals from the vehicle (2) for the purpose of remote control or self-service of the vehicle treatment system (1). By operating the light signal with a specific predetermined rhythm, and by the camera recognizing these light signals, it is then possible to control system functions by means of the control unit (14). For example, it is possible to start or control and operate the vehicle treatment system (1) in a different manner such as by the operator of the vehicle from the vehicle (2).

The exemplary embodiment of FIG. 1 provides one single camera (24) which is preferably rigidly arranged and which is essentially positioned in the drive-in ideal line (29). Its viewing direction (31) is directed onto the drive-in track (21) or the vehicle (2), and extends along the ideal lines (29). The camera (24) is preferably arranged approximately at the level of the radiator grill. It is provided at the rearward end of the vehicle treatment system (1) and can be arranged below, behind or directly on the portal (3).

Figure 3:
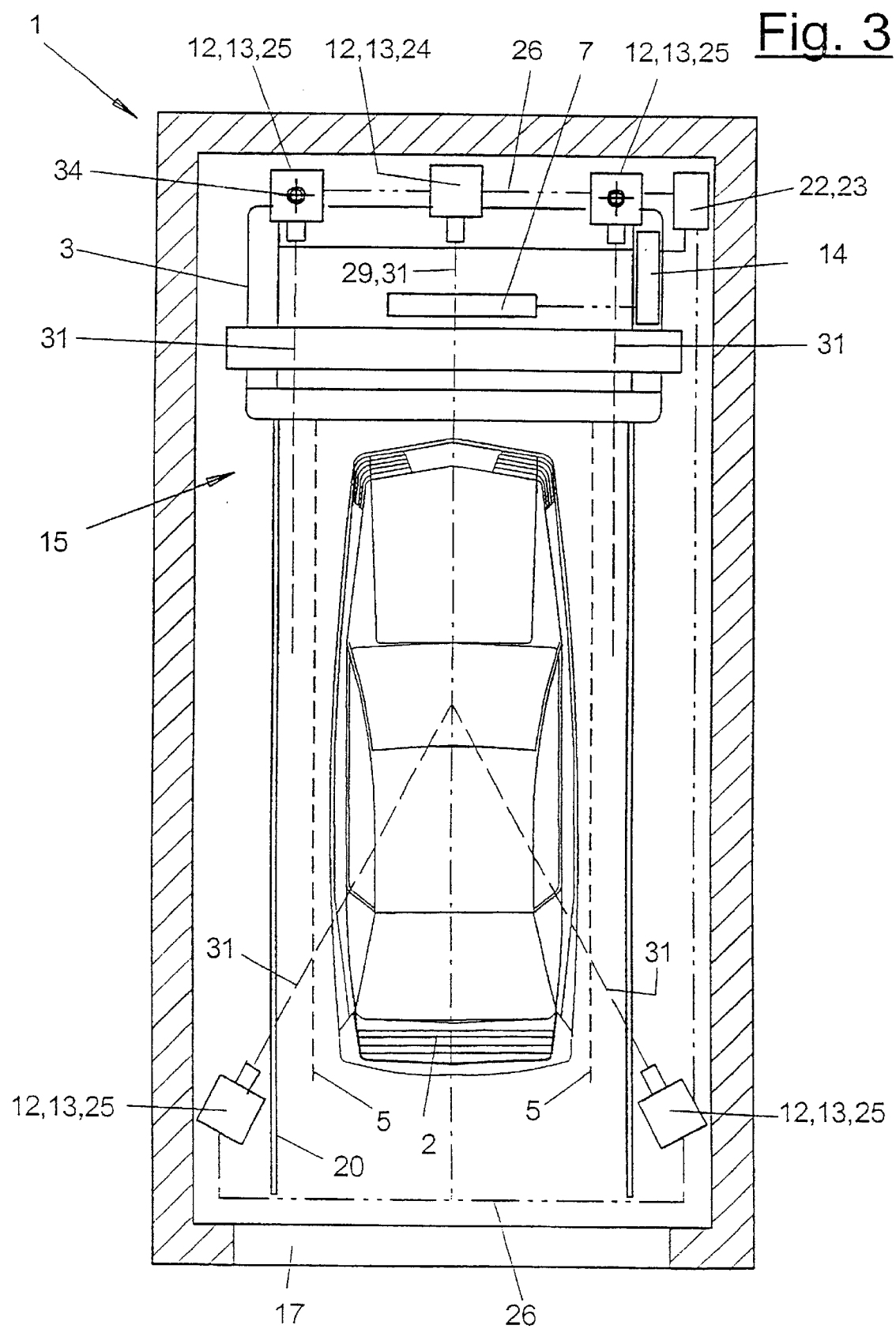
FIG. 3 illustrates a modification of FIGS. 1 and 2 with movable cameras.

FIGS. 2 and 3 illustrate modifications, where several cameras (24, 25) are provided. The center camera (24), which is arranged in the ideal line (29), is the same camera as in FIG. 1. In addition, further cameras (25) are positioned around the drive-in track (21) or the driven-in vehicle (2). These can be, for example, two cameras (25) arranged on both sides next to the center camera (24) as illustrated in FIG. 2, which cameras (25) are directed each with their viewing directions (31) inclined onto the drive-in track (21) or the vehicle (2). As an alternative, or in addition, it is possible to arrange two further cameras (25) near the entry (17), which cameras are each positioned on the sidewalls or in the corner area of the vehicle treatment system (1), and which are directed with their viewing directions (31) from the rear onto the vehicle (2) in the destination position.

As an alternative, it is also possible to position one or several cameras along the drive-in track (21) in a transversely directed viewing direction (not illustrated).

The cameras (24, 25) can be installed stationarily and rigidly. As an alternative, or in addition, it is possible to arrange one or all cameras (24, 25) movably through a swivel arm, carriage or the like or so that they are automatically movably, for example rotatably or pivotally. This can be advantageous for the detection of the lateral shape or height contour of a vehicle when driving into the system (1). The length and height and the contour of the vehicle (2) over the hood of the engine, roof, rear area and windshields is hereby detected, stored and utilized for a suitable evaluation with the hereinafter described possibilities. In the case of movable cameras (24, 25) it is possible to provide a suitable measuring system for detecting the camera movements and for the corresponding evaluation or correction of the camera measurement data.

At least one camera (25) is arranged movably in the modification of FIG. 3 and has a precision controllable positioning device (34) rotatable about the vertical for exact positioning and/or alignment. FIG. 3 also illustrates the case where the two front-side cameras (25), which are arranged laterally under the portal (3), can assume a viewing direction (31) along and essentially parallel to the side surfaces of the vehicle (2).

The camera system (12) can be utilized to control a drive-in aid (19). The drive-in aid (19) houses a corresponding separate control unit or is connected to the control unit (14) of the vehicle treatment system (1) and to a signaling device (7) with information (10) regarding the direction of travel in order for the operator of the vehicle to guide the vehicle. The drive-in aid (19) can optically and/or acoustically guide the vehicle operator in a suitable manner using the camera data through the signaling device (7). The information (10) regarding the direction of travel can be used to inform the vehicle operator when the vehicle is in a skewed position (30), of correction and steering aids in order to maintain the mostly center drive-in ideal line (29), for the correct drive-in direction (16) and for the correct stop position at the portal (3). Moreover, the signaling device (7) can transmit further information, for example, for the actual vehicle position or for the length of path which is yet to be traveled forwardly, etc. Mechanical guideways or drive-in aids, in particular guide rails on the ground for the wheels of the vehicle are therefore not needed.

The camera system (12) detects the longitudinally extending edge-interruption limit (5) of the portal (3). These edge-interruption limits can be determined in any desired manner corresponding to the design of the portal (3) or of the treatment devices (4, 6). FIG. 1 shows clearly, for example, that these vertical edge-interruption limits (5) extend a small distance within the washing brushes in the rest position. If necessary, it is also possible for the lateral dryer nozzles or high-pressure nozzles (not illustrated) to define the inner vertical edge-interruption limit and its position relative to the drive-in track (21). An edge-interruption limit is created above the path of travel of the portal (3) along the drive-in direction (16).

The camera system (12) can determine skewed positions (30) or a lateral shift of the vehicle (2) during driving in and prior to the vehicle reaching the end position at the portal (3). FIG. 2 illustrates this by showing a skewed position (30) of the vehicle (2). The right rear of the vehicle extends here into the edge-interruption limit (5) and could collide with the portal (3) or its parts during the cleaning operation.

When such incorrect positions of the vehicle (2) when driving in are found, the control unit (14) determines the necessary correction aid based on the image evaluation and a suitable program and signals the same to the vehicle operator through travel-direction instructions (10). The operator receives for this purpose an acoustical, optical or otherwise suitable signal that he should turn the steering wheel to the right, in the illustrated exemplary embodiment, in order to correct the lateral shift and the skewed position and to return the vehicle to the correct drive-in ideal line (29). As soon as the steering aid shows action and the vehicle assumes again the correct position, the correction instruction is cancelled.

Should the vehicle operator park the vehicle (2) in an incorrect position, the control unit (14) transmits a suitable instruction to the vehicle operator through the signaling device (7). Furthermore the control unit (14) can block the vehicle cleaning system (1) and prevent the start of the gantry (3) and of the treatment devices (4, 5).

The single camera (24) is already able to determine lateral incorrect positions of the vehicle (2) relative to the ideal line (29) in the above manner. By storing and comparing the received position data of the vehicle (2) over the path of travel it is also possible to determine skewed positions (30) of the driving-in vehicle (2). Three-dimensional images can be directly received and evaluated from several differently positioned cameras (24, 25) and the image-data alignment.

The cameras (24, 25) have in a simple embodiment a low resolution and can detect essentially only the turned-on headlights (27) or light cones (28) of the vehicle (2) that is driving in. They are detected as two light spots accentuated over the lighter surroundings. From the position of the headlights (27) it is possible to calculate the centerpoint of the vehicle and a possible lateral deviation from the predetermined drive-in ideal line (29). By storing and comparing the changing headlight positions during driving in it is also possible to determine the direction of travel of the vehicle (2). In addition, the optical detection device (24, 25) can also determine the distance of the vehicle (3) from its final destination point at the portal (3). In connection with the low resolution, there exist low demands on the calculating capacity of the control unit (14). Accordingly, the expense for hardware and software can be kept low.

With more complex and higher resolution cameras (24, 25), it is also possible to take more complex images of the vehicle (2) and in particular the edges and other parts of the body of the vehicle can be optically detected and scanned. This image data can be utilized in the aforementioned manner for the evaluation of the position and alignment (30) of the vehicle (2).

The camera system can, however, also be utilized for the control of the vehicle treatment system (1). The detected contour data of the vehicle (2) can hereby be utilized for controlling the washing or polishing device (4) and the portal (3). Thus it is possible to control washing brushes (33), in particular to control the high-pressure washing nozzles precisely and with an optimum brush contact pressure or optimum nozzle spacing depending on the position and the contour of the vehicle (2). In a similar manner it is also possible to control application devices for water, rinsing agents, foam, cleaning media, etc. and drying nozzles in the hood, window and roof areas and on the sides of the vehicle. Depending on the type of vehicle, a different contour adaptation of the washing or polishing device (4) can also take place.

The brush positions can be optimized with respect to the various vehicle shapes and in particular for different vehicle contours, for example retractable roofs, and can be adapted to the respective vehicle shape. An angular adjustment of the side brushes (33) to the lateral window or roof inclination or to a sloped rear end of the vehicle can hereby occur, as is, for example, illustrated in FIG. 4. Aside from the inclination, it is also possible to control or, if necessary, regulate with the camera system (12) the depth of immersion of the various washing brushes (33) on the vehicle (2). In forward-control vehicles with a high and steep vehicle front, the dwell time of the treatment aggregates is extended. Also it is possible to stop at the wheels of the vehicle for washing the wheels.

The camera system (12) also permits a regulating of the washing and polishing device (4) and of the portal (3) through an online control of their position and function during operation.

Furthermore, the camera system (12) can be utilized in connection with a system monitor (15). It can thus enable a visual monitoring of the washing and polishing operation for the system operator through, for example, a monitor, a recording device, etc. Possible collisions, insufficient washing or polishing results, etc. can also be detected in this manner and can at least be recorded or, if necessary, can also be evaluated for correction and a repeat of the washing or polishing operation.

In particular, incorrect functions or incorrect positions of the treatment device (4) and in particular of the washing brushes (33) can be quickly and safely detected, and, if necessary, can be corrected. For example, this can be the case when a washing brush (33) winds itself around projections on the vehicle (2), for example a trailer hitch, and gets stuck. Such a blocking can be determined optically through an unusual inclined position or a constriction and collapsing of the washing brush (33).

The camera system (12) can also be utilized for a remote control or self-service of the vehicle treatment system (1). The driver can, after reaching the desired, and correct, position of the vehicle (2), turn on the headlights (27) or operate the light signal. This light signal (12) is received by the camera system (12) positioned in front of the vehicle (2) and is fed to the control unit (14). At a suitable point in the image-evaluating device (23) or the control unit (22, 14) there occurs an evaluation of the received light signals, whereby a distinction with respect to the light conditions in the surrounding area is made. It is reliably determined through suitable logical comparisons and plausibility controls whether it is indeed a light signal that has been given by the vehicle operator.

When this is determined, the control unit (14) starts the vehicle treatment system (1) and starts the treatment process. The vehicle occupants may remain in the vehicle (2) during starting and during the treatment process. After the treatment has been completed the vehicle (2) can exit.

The treatment process and the vehicle treatment system (1) can be stopped during operation through the camera system (12) and through light signals from the vehicle (2) if errors, collisions of devices or other critical situations arise. For this purpose, the stop signal can be given, for example, with a different blinking rhythm than the start signal.

The signaling device (7) in the illustrated exemplary embodiments is stored in the portal opening under the crossbeam. It is preferably arranged on the roof-drying nozzle (6) and is directed toward the vehicle operator. The signaling device (7) is in the case of an elevationally movable roof-drying nozzle moved by the nozzle movements into and out of the viewing range of the driver. However, as an alternative it can be arranged on the portal (3) or at another suitable area of the vehicle treatment system (1).

The signaling device (7) can be designed in various ways. In the illustrated exemplary embodiment there is included a switchable optical indicator (8) consisting, for example, of a colored signal (9) with one or several differently colored lights. With the colors red/green the driver can, for example, be signaled how far he can yet proceed relative to the portal (3).

The signaling device (7) can alternatively and in addition have travel-direction instructions (10) in form of illuminated arrows and/or one or more switchable signs (11). The signaling device (7) can in particular have a graphic-capable LCD, TFT or LED display or any other display. The driver can through this display optically receive any desired text. In addition to the text, it is also possible to signal images or symbols. Through a moving light, the sign (11) enables a complete guidance of the vehicle operator with full instruction texts. It can function as a travel-direction instruction. The transmitted information can have any desired content. Aside from the aforementioned drive-in instructions (10) it is, for example, also possible to transmit information regarding the washing offer, the price, the advertisement or the like.

The operator information is not only given during entry and parking of the vehicle. An information transmission is also possible during the washing process or at its end during exiting. It is, for example, possible to signal during the washing operation the extent of the chosen washing operation and the state of the individual treatment operations. After the washing is complete, the driver receives exiting information, advertisements, a thank you or the like. Basically the information transmitted by the signaling device (7) can be of any desired nature.

The illustrated exemplary embodiments can be modified in various ways. The cameras (24, 25) can vary in number, arrangement and design. They can, in particular, be arranged on the portal (3). The evaluation of the image data can be done in varying manners. Furthermore the camera system (12) can also influence different functions of the vehicle treatment system (1).

What is claimed is:

1. A method for the operation of a vehicle treatment system, comprising at least one treatment device for cleaning or polishing a vehicle, a control unit and a camera system for optical detection of a presence of a vehicle, the method comprising the steps of:

optically detecting a presence of a vehicle and evaluating a position and an alignment of the vehicle when driving into the vehicle treatment system from a front portion of the vehicle using the camera system located within the vehicle treatment system;

feeding data from the camera system into the control unit;

controlling and regulating one or several system functions of the treatment device using the control unit; and controlling a drive-in aid in response to the detected position and alignment of the vehicle to ensure the vehicle is located in a treatment position.

2. The method according to claim 1, including the step of measuring alignment and contour of the vehicle in the treatment position to control the treatment device.

3. The method according to claim 1, including the steps of measuring the alignment and contour of the vehicle in the treatment position, and a controlling a video system monitor for visual image monitoring of the treatment operation by a system operator.

4. The method for the operation of the vehicle treatment system of claim 1, including the steps of:

controlling vehicle lights to start operation of the treatment device, and controlling the vehicle lights to stop operation of the treatment device, wherein the vehicle lights output light signals that are received by the camera system and provided to the control unit.

5. The method for the operation of the vehicle treatment system of claim 1, including the step of preventing operation of the treatment device when the camera system and the control unit determine that the vehicle is not properly aligned at the treatment position.

6. A vehicle treatment system, comprising:

at least one treatment device for at least one of cleaning and polishing a vehicle, a camera system arranged within the vehicle treatment system for optical detection of a vehicle driving in or parked in the vehicle treatment system;

a control unit for receiving signals from said camera system and controlling one or several system functions of said treatment device; and a drive-in-aid including a signaling device with a travel-direction display, said signaling device being connected to said control unit for outputting signals to ensure a vehicle is located in an exact treatment position.

7. The vehicle treatment system according to claim 6, wherein the camera system includes at least one camera that is arranged with a viewing direction toward the vehicle.

8. The vehicle treatment system according to claim 7, wherein the camera system includes several cameras that are arranged around the vehicle.

9. The vehicle treatment system according to claim 7, wherein the camera system is connected to an image-evaluating device.

10. The vehicle treatment system according to claim 9, wherein the camera system and the image-evaluating device are arranged as a measuring device for detecting and measuring the position, alignment and contour of the vehicle.

11. The vehicle treatment system according to claim 9, wherein the image-evaluating device is connected to the control unit of the vehicle treatment system.

12. The vehicle treatment system according to claim 7, wherein the at least one camera is connected to an image-evaluating device and the control unit through a videobus.

13. The vehicle treatment system according to claim 8, wherein a videobus connects the several cameras to one another and the control unit.

14. The vehicle treatment system according to claim 6, wherein at least one camera is arranged below or behind a portal of the vehicle treatment system, and is positioned in a drive-in ideal line with a viewing direction toward a driving-in or standing vehicle.

15. The vehicle treatment system according to claim 6, wherein the camera system is connected to a video system monitor for viewing of visual images by a system operator.

16. The vehicle treatment system according to claim 7, wherein the at least one camera has a resolution capable of detecting and measuring operating headlights of the vehicle providing light signals to start and stop operation of the treatment device.

17. The vehicle treatment system according to claim 7, wherein the at least one camera has a resolution capable of detecting and measuring a contour of the vehicle.

18. The vehicle treatment system according to claim 7, wherein the at least one camera is pivotably or rotatively movable and the camera system includes a position measuring device for detecting camera movements and for outputting a position signal for the camera.

19. The vehicle treatment system of claim 6, wherein said treatment system is free from mechanical guideways or guide rails for receiving tires of a vehicle.

20. The vehicle treatment system of claim 6, wherein said control unit prevents operation of said treatment device when a vehicle is not properly aligned at the treatment position.

21. A vehicle treatment system comprising:

at least one treatment device for at least one of cleaning and polishing a vehicle, a camera system including at least one rotatable or pivotable camera arranged within the vehicle treatment system for viewing a front portion of a vehicle to detect a presence of a vehicle and evaluate a position and an alignment of a vehicle driving into the vehicle treatment system;

a measuring unit for detecting a position of said at least one camera;

a control unit for receiving signals from said camera system and said measuring unit to control at least one of washing or polishing functions of said treatment device, said control unit controlling movement of said at least one camera; and a drive-in-aid device including a signaling device with a travel-direction display, said signaling device being connected to said control unit for outputting travel-direction signals to a vehicle operator to ensure a vehicle is located at a desired treatment location.

22. The vehicle treatment system of claim 21, wherein said control unit prevents operation of said treatment device when a vehicle is not in alignment in the treatment location and wherein said treatment system is free from mechanical guideways or guide rails for receiving tires of a vehicle.

* * * * *